United States Patent
Pimm et al.

(10) Patent No.: US 10,510,100 B2
(45) Date of Patent: Dec. 17, 2019

(54) IMPRESSION TRACKING

(71) Applicant: KING.COM LIMITED, St. Julians (MT)

(72) Inventors: Max Pimm, London (GB); Richard Scarrott, London (GB); Massimo Battestini, London (GB)

(73) Assignee: KING.COM LTD., St. Julians (MT)

( * ) Notice: Subject to any disclaimer, the term of this patent is extended or adjusted under 35 U.S.C. 154(b) by 123 days.

(21) Appl. No.: 15/241,302

(22) Filed: Aug. 19, 2016

(65) Prior Publication Data
US 2018/0053223 A1 Feb. 22, 2018

(51) Int. Cl.
*G06Q 30/00* (2012.01)
*G06F 17/30* (2006.01)
*G06Q 30/02* (2012.01)

(52) U.S. Cl.
CPC .............. *G06Q 30/0275* (2013.01)

(58) Field of Classification Search
CPC ............ G06Q 30/0275; G06F 17/30371
USPC .................... 705/14.71; 707/803
See application file for complete search history.

(56) References Cited

U.S. PATENT DOCUMENTS

| | | | | |
|---|---|---|---|---|
| 6,584,452 B1* | 6/2003 | Prieto, Jr. | .............. | G06Q 40/04 379/116 |
| 6,976,005 B1* | 12/2005 | Bansal | .............. | G06Q 30/0617 705/26.3 |
| 7,251,628 B1* | 7/2007 | Edlund | .............. | G06Q 30/0601 705/26.3 |
| 7,711,608 B2* | 5/2010 | Asami | .............. | G06Q 30/08 705/26.3 |
| 9,747,618 B1* | 8/2017 | Reiss | .............. | G06Q 30/0275 |
| 2004/0138986 A1* | 7/2004 | Petrovich | .............. | G06Q 30/08 705/37 |
| 2005/0289040 A1* | 12/2005 | Lecker | .............. | G06Q 30/08 705/37 |
| 2007/0168258 A1* | 7/2007 | Asami | .............. | G06Q 30/08 705/26.3 |
| 2012/0303463 A1* | 11/2012 | Stephens | .............. | G06Q 30/0241 705/14.71 |
| 2013/0066694 A1* | 3/2013 | Lifka | .............. | G06Q 30/02 705/14.14 |
| 2014/0379424 A1* | 12/2014 | Shroff | .............. | G06Q 30/0204 705/7.31 |
| 2015/0310485 A1* | 10/2015 | Brown | .............. | H04W 4/21 705/14.45 |
| 2016/0042407 A1* | 2/2016 | Els | .............. | G06Q 30/0275 705/14.71 |
| 2016/0379276 A1* | 12/2016 | Ruggiero | .............. | G06Q 10/06 705/14.71 |
| 2017/0024811 A1* | 1/2017 | Liu | .............. | G06Q 30/0609 |
| 2017/0061471 A1* | 3/2017 | Yu | .............. | G06Q 30/0246 |

* cited by examiner

*Primary Examiner* — Raquel Alvarez
(74) *Attorney, Agent, or Firm* — Saul Ewing Arnstein & Lehr LLP

(57) ABSTRACT

A demand side platform DSP is provided which will receive an advertisement bid win notification comprising identity information and time information, The DSP will check the time information to make sure the notification is not too old. If not the DSP will check if the identity information is in a cache. If not, a check is made against a database. If not, the bid win is recorded in the cache and the database.

22 Claims, 6 Drawing Sheets

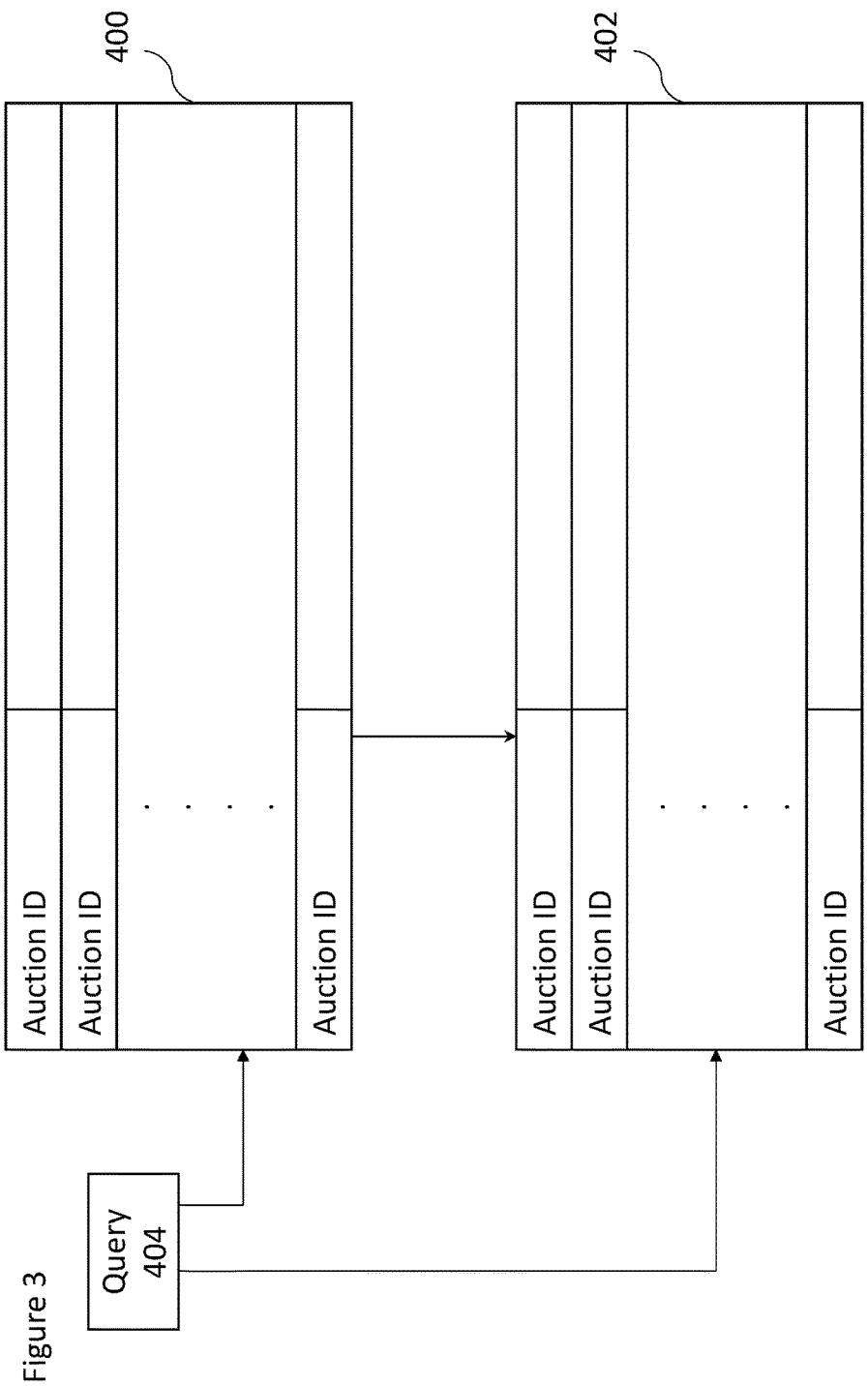

IMPRESSION TRACKING

TECHNICAL FIELD OF THE INVENTION

Some embodiments relate to a computer device and a computer implemented method and in particular, but not exclusively, to a computer device and computer implemented method for managing advertising bid win data.

BACKGROUND OF THE INVENTION

A demand side platform (DSP) is a system that allows buyers of digital advertising inventory to manage multiple ad exchange and data exchange accounts through one interface. Real-time bidding (RTB) ad auctions for displaying online advertising takes place within ad exchanges, and by utilizing a DSP, marketers can manage their bids for advertisements placed and the pricing for the data that they display to users who make up their target audiences.

It is desirable to know accurately bid specific information each time an auction is won. Alternatively or additionally, it may be desirable to know accurately the number of wins made. However, problems may be caused by duplicate or fraudulent notifications being received.

SUMMARY OF THE INVENTION

According to an aspect, there is provided a computer implemented method comprising: receiving an advertisement bid win notification comprising identity information and time information; determining if: said time information satisfies a first criteria; said identity information is in a cache; said identity information is in a database; and when said time information satisfies the first criteria, the identity information is not in said cache and said identity information is not in said database, recording information associated with said advertisement bid win notification in said cache and said database.

It should be appreciated that the first criteria may comprise a single condition or requirement or a plurality of conditions or requirements.

The determining if said identity information is in said cache and in said database may be only performed if said time information satisfies said first criteria.

The determining if said identity information is in said database may be only performed if said identity information is not in said cache.

If said time information does not satisfy the first criteria, the advertisement bid win notification may be discarded.

The determining if said time information satisfies a first criteria may be such that only an advertisement bid win notification less than a predetermined age is used in determining if said respective identity information is in cache or said database.

If the identity information is in at least one of said cache and said database, said advertisement bid win notification may be discarded.

The advertisement bid win notification may comprise data integrity information dependent on said identity information and said time information.

The method may comprise determining if said data integrity information in said advertisement bid win notification is consistent with said identity information and time information in said advertisement bid win notification.

The data integrity information may comprise a result of a hash function applied to said identity information and said time information, said determining if said data integrity information in said advertisement bid win notification is consistent with said identity information and time information in said advertisement bid win notification comprises performing the hash function on the time information and identity information in the advertisement bid win notification and comparing a result of the performed hash function with the data integrity information.

The method may comprise removing information associated with said advertisement bid win notification from said database when said associated time information does not satisfy said first criteria. Alternatively or additionally the method may comprise removing information associated with said advertisement bid win notification from said cache when said associated time information does not satisfy said first criteria.

According to another aspect, there is provided a computer implemented method comprising: receiving an advertisement bid win notification comprising identity information and time information; determining if said time information satisfies a first criteria; if so, determining if said identity information is in a cache; if not, determining if said identity information is in a database; if not recording information associated with said advertisement bid win notification in said cache and said database.

According to another aspect, there is provided a computer device comprising: an input configured to receive an advertisement bid win notification comprising identity information and time information; and at least one processor configured to: determine if: said time information satisfies a first criteria; said identity information is in a cache; said identity information is in a database; and when said time information satisfies the first criteria, the identity information is not in said cache and said identity information is not in said database, record information associated with said advertisement bid win notification in said cache and said database.

The at least one processor may be configured to determine if said identity information is in said cache and in said database only if said time information satisfies said first criteria.

The at least one processor may be configured to determine if said identity information is in said database only if said identity information is not in said cache.

The at least one processor may be configured if said time information does not satisfy the first criteria to discard the advertisement bid win notification.

The at least one processor may be configured such that only an advertisement bid win notification less than a predetermined age is used in determining if said respective identity information is in cache or said database.

If said identity information is in at least one of said cache and said database, said advertisement bid win notification may be discarded.

The advertisement bid win notification may comprise data integrity information dependent on said identity information and said time information.

The at least one processor may be configured to determine if said data integrity information in said advertisement bid win notification is consistent with said identity information and time information in said advertisement bid win notification.

The data integrity information may comprise a result of a hash function applied to said identity information and said time information, and said at least one processor may be configured to determine if said data integrity information in said advertisement bid win notification is consistent with said identity information and time information in said advertisement bid win notification by performing the hash function on the time information and identity information in the advertisement bid win notification and comparing a result of the performed hash function with the data integrity information.

The at least one processor may be configured to remove information associated with said advertisement bid win notification from said database when said associated time information does not satisfy said first criteria.

The computer device may comprise a demand side platform.

According to another aspect, there is provided a computer device comprising: an input configured to receive an advertisement bid win notification comprising identity information and time information; and at least one processor configured to: determine if said time information satisfies a first criteria; if so, determine if said identity information is in a cache; if not, determine if said identity information is in a database; and if not causing said information associated with said advertisement bid win notification to be recorded in said cache and said database.

According to another aspect, there is provided a computer readable non-transitory storage medium carrying one or more sequences of instructions which when run on at least one processor cause the at least one processor to perform the following steps: receive an advertisement bid win notification comprising identity information and time information; determine if: said time information satisfies a first criteria; said identity information is in a cache; said identity information is in a database; and when said time information satisfies the first criteria, the identity information is not in said cache and said identity information is not in said database, record information associated with said advertisement bid win notification in said cache and said database.

According to another aspect, there is provided a computer readable non-transitory storage medium carrying one or more sequences of instructions which when run on at least one processor cause the at least one processor to perform the following steps: receive an advertisement bid win notification comprising identity information and time information; determine if said time information satisfies a first criteria; if so, determine if said identity information is in a cache; if not, determine if said identity information is in a database; if not record information associated with said advertisement bid win notification in said cache and said database.

According to some aspects, there is provided a program product comprising a computer-readable storage device including a computer-readable program, wherein the computer-readable program when executed on a computer causes the computer to perform any one or more of the method steps described previously.

A computer program comprising program code means adapted to perform the method(s) may also be provided. The computer program may be stored and/or otherwise embodied by means of a carrier medium.

In the above, many different embodiments have been described. It should be appreciated that further embodiments may be provided by the combination of any two or more of the embodiments described above.

Various other aspects and further embodiments are also described in the following detailed description and in the attached claims.

BRIEF DESCRIPTION OF THE DRAWINGS

Some embodiments will now be described by way of example only with reference to the accompanying Figures in which:

FIG. 1d shows a flow of the main data communication transfers of the system of FIG. 1a.

FIG. 3 shows a database structure used in some embodiments.

DETAILED DESCRIPTION OF THE INVENTION

The figures depict various embodiments for purposes of illustration only. One skilled in the art will readily recognize from the following discussion that alternative embodiments of the structures and methods illustrated herein may be employed without departing from the principles of the invention described herein.

Figure 1A:
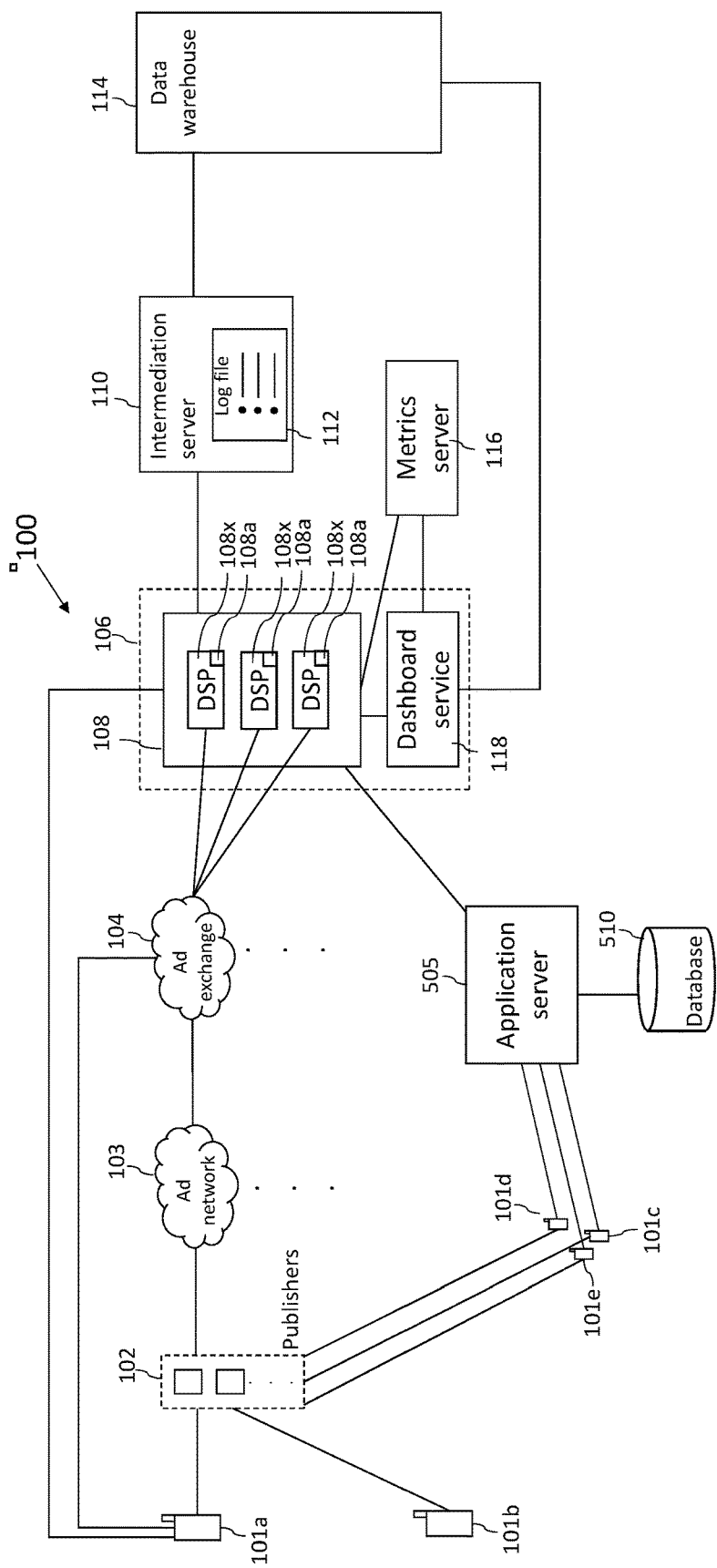
FIG. 1a is a schematic of an advertising exchange system comprising a DSP.

FIG. 1a illustrates a system 100. In one embodiment, each of multiple user terminals 101a toe are operated to run applications. The user terminal 101 may comprise desktop computers, laptops, mobile devices, PDAs. The applications may include applets that are integrated into other applications (e.g. an Internet browser), and dedicated applications in their own right. The applications may comprise games, in some embodiments.

In some embodiments, user terminals or user devices 101c, d and e are associated with a particular service. For example, the service may be a gaming service for game applications. The game applications may be downloaded from one or more application server(s) 505 of the service and/or interact with the application servers when a game application is run on a user's user terminal 101. A game application may access the server 505 in order to communicate over the Internet (WAN) with other players of the applications associated with the gaming service, to download updates, access new content and/or store information about a player's profile and/or preferences. The devices and/or users of the gaming service may also be registered at server 505 and their details may be stored for example in a database 510 also associated with the gaming service.

The skilled person will realise that there may be many other reasons for an application to access the server(s) 505 than those mentioned. Also, although referred to as a gaming service, the particular service may be a service other than a gaming service, and the applications may be applications other than game applications.

When the user terminals 101 are connected to a wide area network (WAN) such as the internet (not shown in FIG. 1a), the applications can automatically send RTB ad calls (auction requests) via the WAN to publishers 102. The publishers 102 forward details of the requests they receive via an advertising network 103 and ad exchange server 104. The ad exchange server 104 itself then sends details of all of the received requests to multiple remote Demand Side Platforms (DSPs) 108. For convenience, FIG. 1a shows only one ad network 103 and one ad exchange 104, although the skilled person would understand that publishers can forward requests to different ad networks, and the DSP 108 can communicate with multiple ad exchanges simultaneously.

Examples of known ad exchanges include: Google™, MoPub™, Nexage™, PubMatic™, Rubicon™, and Smaato™.

FIG. 1a shows a DSP 108. The DSP 108 is located on a publicly accessible network, shown represented by the dashed line 106. In some embodiments, the DSP 108 consists of multiple, typically twenty to thirty, servers referred to hereinafter as DSP application server(s) 108x. In alternative embodiments, the DSP 108 may be implemented as part of a private network.

The DSP 108 can receive hundreds of thousands or potentially millions of ad requests from ad exchanges every second. The requests are received at a load balanced single entry point for the DSP 108 so that the requests are distributed among the multiple DSP application servers 108x. Each ad exchange 104 can connect to multiple DSP application servers 108x. Each DSP application server 108x may connect to a single ad exchange 104 at a time providing a 1:1 relationship between DSP application server 108x and ad exchanges 104. Therefore, in this case it may be said that each ad exchange 104 has an independent collection of DSP application severs 108x. Alternatively, each DSP application sever 108x may connect to multiple different ad exchanges simultaneously.

Because the DSP 108 platform is load balanced, the number of DSP application servers 108x can be dynamically changed or automatically scaled based on load i.e. the volume of RTB auction requests received from an ad exchange. That is if the number of incoming RTB requests increases the number of DSP application servers 108x used to receive those requests can be increased accordingly in order to distribute the load. Similarly, if the number of RTB requests decreases, the number of DSP application servers 108x needed can be reduced accordingly. The load on each DSP may also be controlled so that load is evenly distributed across the DSPs.

Each RTB auction request comprises at least one identifier. In some embodiments, the auction request comprises a set of data, which will include an identifier which is able to identify the request. Typically the auction request will comprise a set of data.

In some embodiments, the data may comprise a cookie identifier (cookie ID) that is unique to a user and is associated with the ad exchange 104.

The set of data that makes up an RTB auction request may be sourced from one or more locations e.g. data store(s) (not shown in FIG. 1a). The set of data included in an RTB auction request may further comprise various different data fields, for example but not limited to one or more user identifiers, the user's geographic location, the user's preferred language, an identifier for the application the RTB auction request has come from (e.g. a type of game).

Figure 1B:
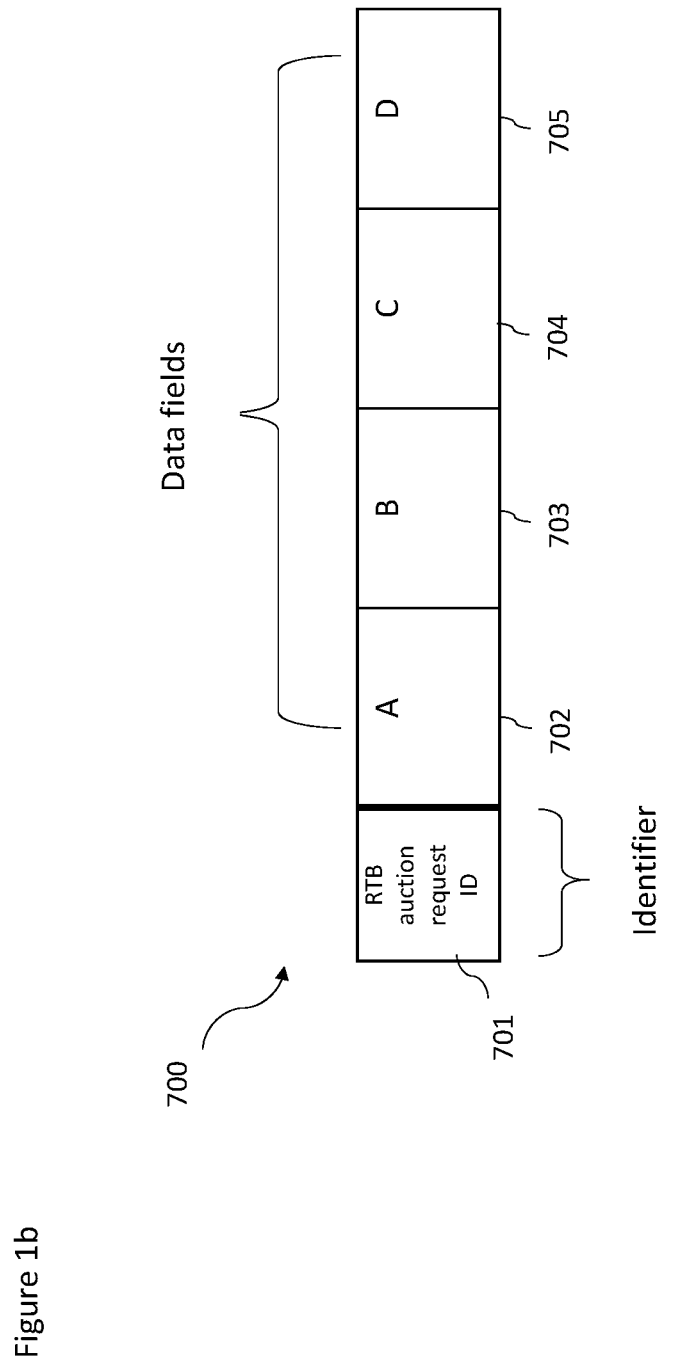
FIG. 1b is a visual representation of an RTB auction request.

FIG. 1b shows an example of a single RTB auction request that is recorded by a DSP application server 108x as an auction "event". In this example, the auction request is shown as a data stream 700 headed by an RTB auction request identifier 701. The stream also includes a sequence of different data fields shown represented as A 702, B 703, C 704 and D 705. The person skilled in the art will appreciate that in embodiments, an RTB request may comprise more or fewer data fields than those shown in FIG. 1b.

It should be noted that any one or more of the data fields (e.g. A, B, C or D) may be left empty, if for example there is no corresponding data currently available for the respective data field. Also, the user of the user terminal 101 can select to opt out of having one or more of the data fields being accessible by the DSP 108. In either of these cases, auction events can still be recorded but without including one or more of the data fields.

The DSP application servers 108x may be configured to filter the RTB requests based on one or more of the available data fields of the RTB auction requests.

For example, a DSP application server 108x may determine from the data fields a type of game that a user is playing. This information can be used to select an advert for a similar type of game that the user may be interested in playing.

The data fields may be filtered based on user ID so that the DSP application server 108x does not place bids too frequently in response to the received RTB auction requests. In this way the user is not constantly bombarded by advertisements. Similarly, filtering based on user ID can be useful so that the DSP application server 108x does not keep selecting the same ad content for a user.

As another example embodiment the data fields may be filtered by the user's language to ensure that adverts with content in the correct language (i.e. in the user's language) are selected and placed for that user.

For each request seen by a DSP server 108x, the DSP application server 108x must decide on behalf of an advertiser it is representing whether or not to make a bid for that opportunity to place an ad so that it is presented in the user's application. If a bid is placed, the DSP application server 108x sends the bid to the ad exchange 104 which processes the bids from other competitors that have also received the same advertising request. As with the RTB auction requests, each auction bid placed by the DSP application servers 108x includes one or more bid-specific identifiers. Each bid also includes the associated one or more auction request identifiers described above, so that every bid is linked to a corresponding RTB auction request.

The DSP application server will receive an event which is sent directly from the user' terminal to the DSP once and advertisement is displayed, when that application server's bid is won. That event will comprise information which allows that event to matched to the corresponding bid. This is described in more detail later.

The winning advertiser thus gets their ad published to the user's application, usually in the form of a banner or a full page shown displayed on the user terminal 101 screen. Other examples of advertisement are video advertisement and native advertisement.

The bids that are made may be part of a "second price auction" such that the advertiser that wins the auction actually ends up paying the second highest price bid for placing the ad in the user's application. Alternatively, the auction and the bids thereof can be of any suitable type of electronic auction as is known in the art.

Each of the DSP application servers 108x listen to all of the RTB requests they receive form the ad exchange.

In embodiments, the server(s) 505 are associated with the proprietor of the DSP 108, meaning that it can be in that proprietor's interests to monitor the data of auction events (requests, bid responses and wins) specifically in relation to the users that are playing a game for example. For example, by assessing the identifiers of the auction event data recorded by the DSP 108 (e.g. from the records stored by the DSP application servers 108x and/or from the log file data 112 imported into data warehouse 114), the DSP 108 can use this information to retarget appropriate ads for a user, as described above. For instance ads may be retargeted to certain ones of the devices and/or users of the subgroup 555. As mentioned above, based on one or more of the data fields of recorded event data, appropriate ad(s) can be selected for users e.g. based on a type of game the user is playing and/or the user's language. The skilled person will understand that there will be many other ways of using the event data information and identifiers for retargeting ads to specific devices and/or users.

Each of the DSP application servers 108x have an associated software agent 108a running on a processor 901 (see FIG. 1c) of the respective DSP application server 108x. The software agent 108a collects the metrics from the DSP application server 108x that it is running on. The collected metrics for all of the DSP application servers 108x are aggregated and stored in a metrics server 116.

The metrics data stored in metrics server 116 is accessible by a dashboard service 118 running on a computing device (not shown in FIG. 1).

Each of the DSP application servers 108x export their recorded event data to a third party remote shared file server 110, also known as an intermediation server, and located outside of the cloud 106, upon expiry of a predefined time interval. For example, each of the DSP application servers 108x is configured to export their recorded event data every hour. Other time intervals may be defined for the DSP application servers 108x to export their recorded data.

Figure 1C:
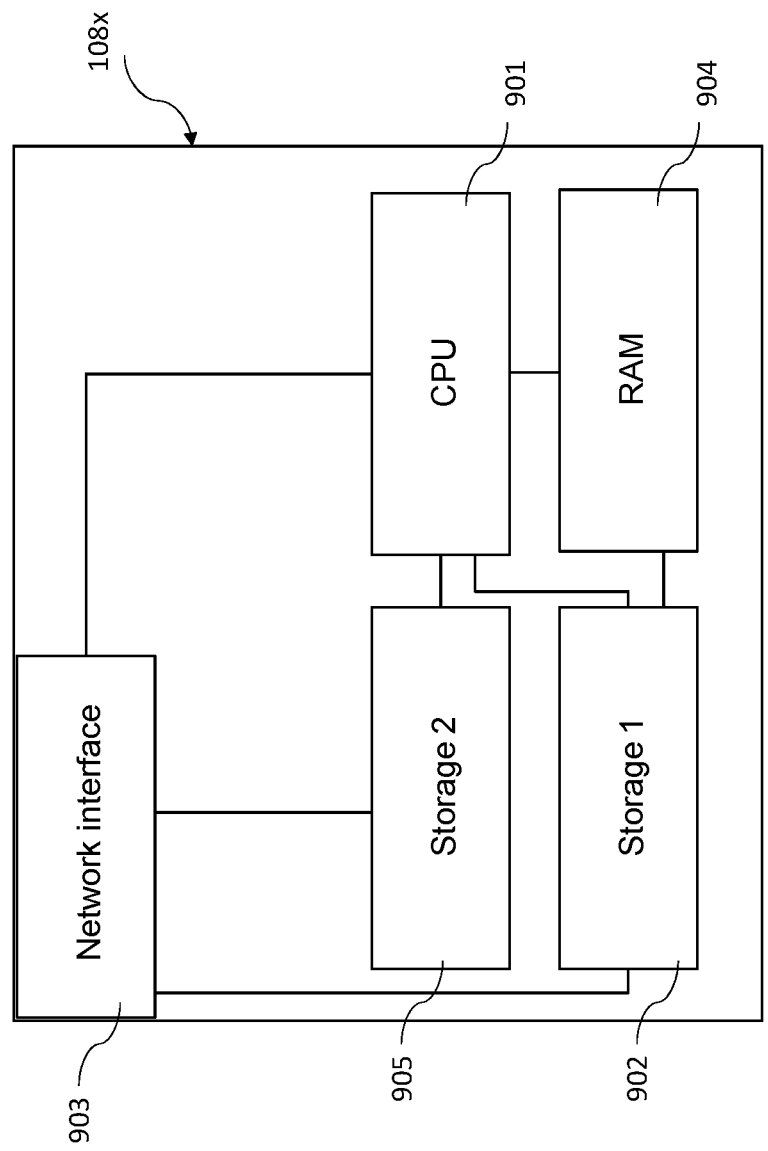
FIG. 1c shows a schematic representation of a DSP application server.

Referring to FIG. 1c, an example schematic representation of a DSP application server 108x is shown. The DSP application server 108x comprises one or more central processing unit(s) (CPU) 901 or one or more processors for performing the processes of the DSP application server 108x as described throughout the present disclosure. The CPU 901 is connected to a first local memory store 902 that stores software instructions which are run by the CPU 901. The software instructions include the instructions required by the CPU 901 to perform the steps of sampling the received auction requests and filtering the data fields of the RTB auction requests. The software instructions also enable a network interface or port 903 to send and receive messages and data, for example over the WAN, to and from the various other entities the DSP application server 108x communicates with e.g. the user terminals 101, ad exchanges 104, dashboard service 118, metrics server 116, remote shared file server 110, application server 505 and database 510.

The DSP application server 108x also comprises Random Access Memory (RAM) 904 that loads the software instructions to be run on the CPU 901. When the software is run by the CPU 901 this forms the software agent 108a as depicted running on DSP application server 108x in FIG. 1a. The DSP application server 108x also comprises a second local memory store 905 that temporarily stores the auction events data prior to exporting them to the remote shared file server 110. Alternatively, the DSP application server 108x may only have a single memory store, e.g. local memory 902, which can be shared or split between both the stored software and the stored auction events data. The incoming set of data making up an RTB auction request is received at the network interface 903. The CPU 901 processes the received data, and compiles it into an auction request event which is stored in the local memory store (i.e. 902 or 905). The CPU 901 can also be configured so that it performs the step of exporting the stored event data to the remote shared file server 110 upon expiry of a programmable time interval.

Figure 1D:
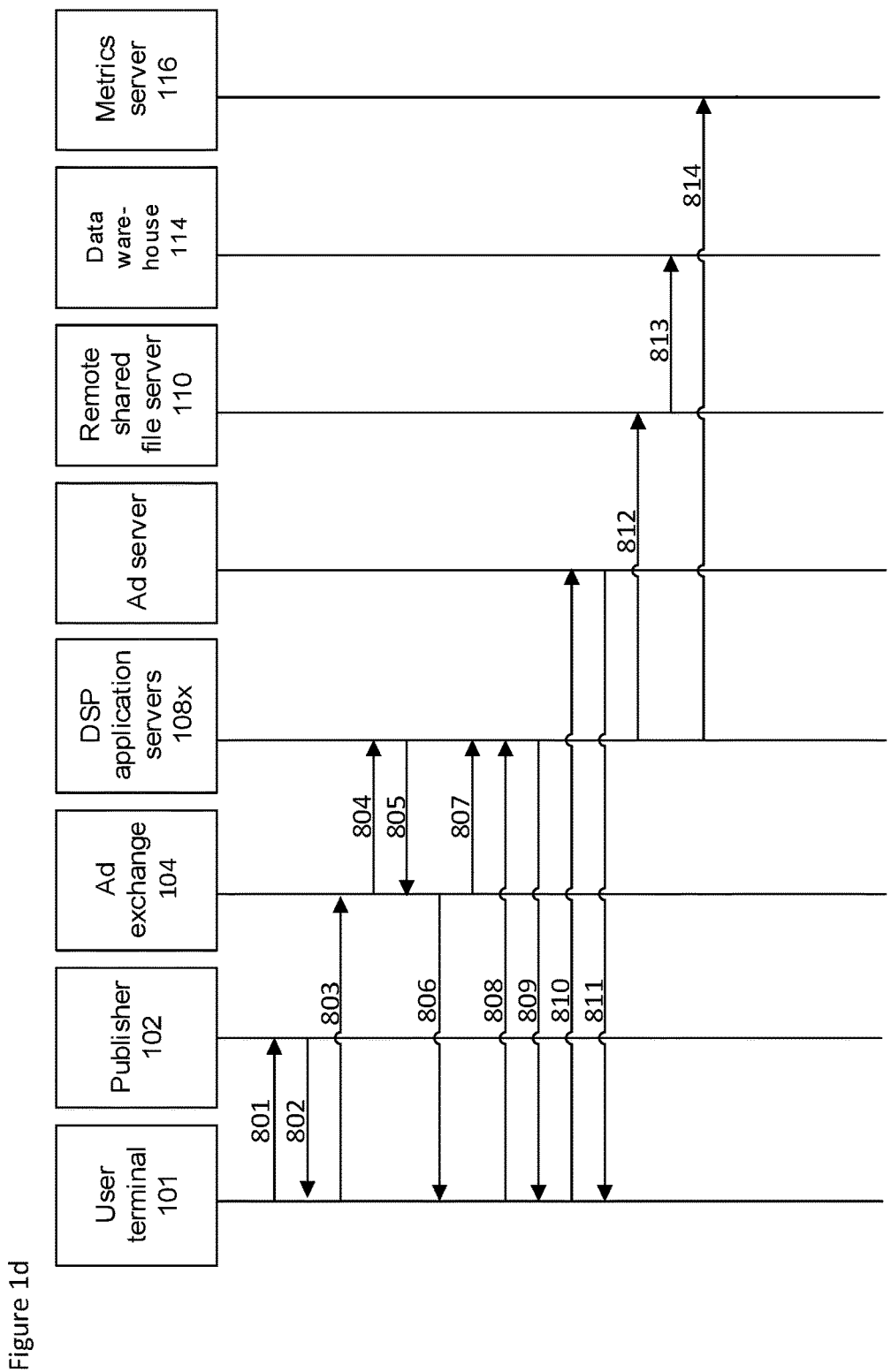

FIG. 1d depicts a visual flow of the main data communication transfer steps performed by the system 100.

At step S801, a user of the user terminal 101 uses an installed web browser or application to navigate to a website or access a service associated with a publisher 102.

At step 802, a publisher web server sends back code, usually in the form of HTML code although other code language types may be used. The code returned to the browser (or application) indicates a publisher ad server that the browser can access to download a further HTML code comprising a coded link known as an ad tag. The ad tag points the user terminal to the RTB enabled ad exchange 104 and causes the user terminal 101 to pass on information about the publisher's ID, the site ID and ad slot dimensions when an ad request is made.

At step 803, an RTB request for bid (RFB) is generated by a processor of the user terminal 101 and sent directly over the WAN to the ad exchange 104.

At step 804, the ad exchange commences the RTB auction procedure by forwarding the received requests to the DSP application servers 108x.

The DSP application servers 108x use the retrieved user data information and the publisher information in the originally received auction request and the tree structure of FIG. 3 to determine whether to place a bid (bid response). The bid data comprises one or more of the associated auction request identifiers plus bid-specific identifiers as described above. The bid also includes a DSP redirect for the user terminal 101, should the bid win the RTB auction. The bid data is communicated by the DSP application server 108x back to the ad exchange 104 (step 805).

At step, 806 the ad exchange 104 selects the winning bid and passes the DSP redirect to the user terminal 101 associated with the winning bid. In some embodiments, the DSP application server 108x is also informed of the win where a win event is recorded (step 807). The win event includes one or more win-specific identifiers plus the associated one or more auction request identifiers, and optionally the bid-specific identifier(s) as well. However, in other embodiments, this notification of the win event may be omitted.

At step 808, the user terminal 101 directly calls the DSP 108 using the DSP redirect received at step 806.

By return, the DSP 108 sends to the user terminal 101 details of the winning advertiser's ad server by way of an ad server redirect at step 809. The user terminal 101 uses the ad server redirect to call the ad server at step 810, and in response the ad server serves the final advertisement (e.g. banner, window, full screen ad) for presentation in the bowser (or application) at the user terminal 101 at step 811.

In some embodiments, the steps 806 to 810 may be simplified such that the ad exchange may provide the advertisement associated with the winning bid to the user device and the user device At step 812, the DSP application servers 108x routinely export the event data to the remote shared file server 110.

In turn, at step 813, the data warehouse 114 is configured to import the log file of event data from the remote shared file server 110.

In parallel with the steps of recording the auction activities as auction events, the DSP application servers 108x collect metrics for all of the observed auction activities and stores them in metrics server 116 (step 814).

As discussed previously, the DSP servers are acting as RTB (Real Time Bidding) servers and are continuously bidding on ad spaces that satisfy one or more criteria. The bids are part of an auction mechanism in which a winner is chosen in real time.

If one of the bids that is placed is a winning bid, once the advert is displayed, a win notification event is received by the DSP server.

As will be described in more detail, data integrity is achieved by adding data integrity to the win notification URL (uniform resource locator). This data integrity may be an HMAC (hash based message authentication code). Replay (where the same event is recorded as two or more separate events) may be avoided by a using a two layer distributed cache. This may be achieved using a two layer 24 hour distributed cache.

Win notification events take the shape of an HTTP (hypertext transfer protocol) GET request. A GET request will request data from a specified source. These URLs are built on the DSP servers and passed to the ad exchanges 104 during the bid phase. This gives flexibility when building the URL. The URL's are unique for each bid and composed at the time of bid. This allows custom data to be attached to the bid and later retrieved. Upon winning the auction the winning URL will be invoked directly from the ad exchange 104 or in the final user device using either the HTTP or HTTPS (HTTP Secure) protocol (depending on which one is supported). Embodiments may provide a good level of security against fraudulent notifications and fraudulent URL data.

Most win notifications come within seconds of the bid being made. However due to local caching in some apps win notifications can arrive later. Generally it is considered that notifications arriving more than a predetermined time after the bid as fraudulent. That time may be any suitable time and may for example be 24 hours or any other suitable time frame.

Embodiments may protect the win notification mechanism against:

Modification (none of the URL parameters should be modified);

Replay (the same URL cannot be re-used two or more times); and/or

Stale notifications (notifications received outside a given time window are not considered).

Modification may be as a result of fraud or malicious intent. Alternatively, modification may be result of a software bug or the like.

This is achieved in two phases—win notification URL preparation and win notification URL validation:

The win notification URL preparation will now be described. The DSP server prepares a win notification URL. The URL will comprise a unique auction identity information, the time information and data integrity information. Price and bid information may also be provided. One example of a URL may be as below.
http://host/path?id=${AUCTION ID}&t={TIMESTAMP IN SEC}&auth=$auth=${AUTHORISATION}&price=${AUCTION PRICE}&big=${AUCTION BID ID}
where the id parameter represents the unique auction id, the t parameter represents a timestamp in seconds, the auth parameter the data integrity code, the price parameter the auction price and the bid parameter the auction bid identity.

The data integrity code may be based one or more of the parameters. In one embodiment, the data integrity code is based on the id and t parameters. In other embodiments, the data integrity code may be based one or more other parameters and/or one or more additional parameters.

In some embodiments the code may be a HMAC code, for example assessed as the HMAC-SHA256 (Hash-based Message Authentication Code using the SHA (secure hash algorithms) 256) of the id and t parameters using a cryptographic key. It should be appreciated that in other embodiments, any of the family of SHA may be used—SHA-2, SHA-512, and SHA-3. Of course any other suitable cryptographic technique may alternatively be used.

The cryptographic key is stored within a file on the DSP server and is stretched using a key in the code base. Key stretching is a technique used to increase the strength of stored passwords and prevent the success of some password attacks such as brute force attacks. This increases a shorter key into a longer key. This may be optional in some embodiments.

The win notification URL validation will now be described. The validation will comprise the following checks.

1. Timestamp validation: the timestamp must not be older than X where X has any suitable value. For example, X may be 24 hours.
2. Integrity of auction id and timestamp parameters: The same HMAC-SHA256 operation is performed to generate and data integrity code which is then compared against the auth parameter
3. Validate that the same auction id has not already been used. This is done querying a first a local cache and then a database table. If the auction id (which is supposed to be unique) is already in the database table the notification it will be blocked; if not it will be added to the database.

Data integrity provided by using the HMAC algorithm. This checks the integrity only for the auction id and timestamp parameters, but since there is also a check to see the auction id has already been used, data integrity may thus be considered to extend to all the URL parameters. Any change to the id or t parameter will be determined by the auth parameter, while any change to the additional parameters will imply a re-use of the same auction id, which is looked for.

Some embodiments may use all the URL parameters for calculating the HMAC algorithm, which will require additional computational time. This approach has flexibility in that adding/removing extra parameters is more complex. This may be useful in some scenarios. In other situations, using only the id and timestamp parameters may be quicker to compute and be more flexible in terms of adding removing other parameters. The approach, which is selected, will thus depend on requirements of the system.

As mentioned, some embodiments may provide protection against replay or reuse of the auction ID. The auction id is matched against the already seen auction ids and that provides protection against replays.

In some embodiments, the database table that holds these records is kept relatively small by removing entries older than X. Those entries would have been blocked by the timestamp in any event. These entries may be likewise removed from the cache.

As the table is kept relatively small, with regular cleansing and as the DB query (an expensive operation in terms of time) is performed last in some embodiments, this may lead to efficiency.

Figure 2:
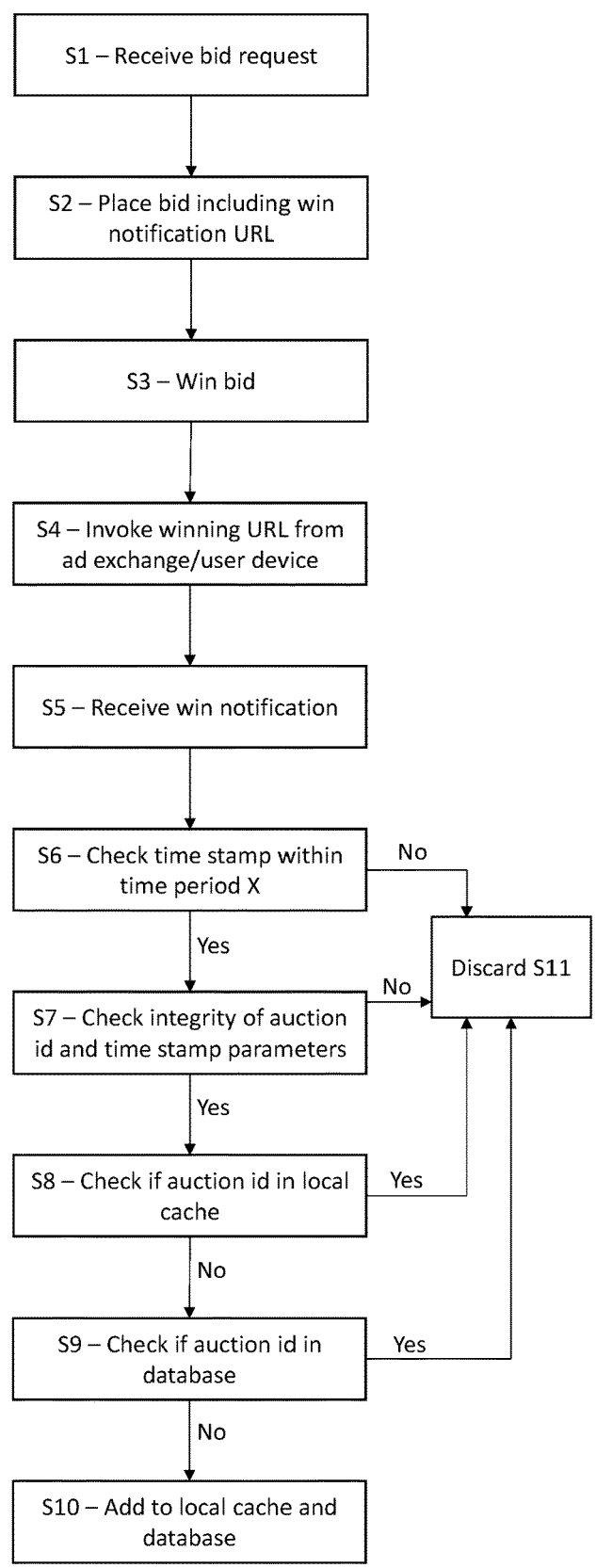
FIG. 2 shows a method flow.

A method of an embodiment will now be described in relation to FIG. 2. One or more of the steps may be implemented at least partially by computer program instructions, which are executed by at least one processor of a respective device.

In step S1, a bid request is received. This may be received by a DSP server from the ad exchange.

In step S2, a bid is placed by the DSP server, which includes the win notification URL, and this is transmitted to the ad exchange.

In step S3, the ad exchange determines if the bid is won.

In step S4, the winning URL is invoked from the ad exchange or user device when the advertisement is displayed on the user device.

It should be appreciated that steps S1 to S4 may be as discussed in more detail in relation to steps 804 to 811.

In step S5, DSP server receives a win notification when the advert is displayed on the user device. This may be from the user device, the ad exchange and/or the ad server. The win notification will include the URL.

In step S6, it is determined if the time stamp in the URL is within the time period X. If not, the next step is step S11 where the where the win notification is discarded. This may be done by the endpoint where the notification is sent. This is the DSP or a dedicated service responsible for processing win notifications. This endpoint is provided by a computer device.

If the time stamp is within the time period X, the next step is step S7. In step S7, the integrity of the auction ID and time stamp parameters is checked using the data integrity parameter. This may be done the by endpoint. If the check fails, the next step is again step S11 where the win notification is discarded.

In step S8, the auction ID is checked in the endpoint to see if it is in the local cache. If so, the next step is step S11, where the win notification is again discarded. This is because if the auction ID is in the local cache, this means that the win notification has already been received.

If not, the next step is step S9 to see if the auction ID is in the database. If so, the next step is step S11 where the win notification is discarded. This is because of the auction ID is already in the database, this means a win notification with the auction ID has already been received.

If not, the next step is step S10 where the win notification is added to the local cache and database.

The win notifications which are recorded in the database are used when doing data analytics to see which bids have been successful, to determine which advertisements have been placed and to verify the associated financial data. The data may be used to build bid models, to validate the invoices that are received from ad exchanges, to detect fraudulent devices and/or for any suitable reason.

Reference is made to FIG. 3, which schematically shows a database 402 and a local cache 400. This may be a different database to the metrics database. The local cache is configured to store data for a period of time Y, where Y is less than X. Where X is 24 hours, Y may for example be of the order of 2 or 3 hours. Of course, Y may be smaller or larger than these example values. In other embodiments, the cache may have a limited capacity and the older entries are removed to accommodate the newer entries.

The local cache will contain the auction id. In some embodiments, this is the only information in the local cache. In other embodiments, one or more additional different types of information may be stored.

The database 402 may but not necessarily contain the same information as the local cache. For example, the database may comprise a flag that denotes whether the win resulted in an impression or not. An impression is when an advertisement is fetched by a user terminal.

As schematically shown by reference 404, a query can be made to the local cache and the database. In practice, the query is first to the local cache and if that fails then to the database.

The database aggregates data from the local caches.

Various embodiments of methods and devices have been described in the foregoing. It should be appreciated that such may be implemented in apparatus, where the apparatus is implemented by any suitable circuitry. Some embodiments may be implemented by at least one memory and at least one processor. The memory may be provided by memory circuitry and the processor may be provided by processor circuitry. Some embodiments may be provided by a computer program running on the at least one processor. The computer program may comprise computer implemented instructions which are stored in the at least one memory and which may be run on the at least one processor. The computer program may be provided by a computer program product. The computer program may be provided by a non-transitory computer program product.

It is also noted herein that there are several variations and modifications which may be made to the disclosed solution without departing from the scope of the present disclosure.

The invention claimed is:

1. A computer implemented method implemented in a server, the method comprising:
   receiving a first advertisement bid win notification comprising first identity information and a first timestamp;
   checking by at least one processor of the server said first timestamp to determine whether the first timestamp is older than a predefined time;
   checking, by the at least one processor of the server, a database to determine whether said first identity information is stored in a cache;
   checking, by the at least one processor of the server, a database to determine whether said first identity information is stored in the database; and
   in response to determining that said first timestamp is not older than the predefined time, the first identity information is not stored in said cache and said first identity information is not stored in said database, recording information associated with said first advertisement bid win notification in said cache and said database.

2. A computer implemented method as claimed in claim 1, comprising:
   receiving a further plurality of advertisement bid win notifications, each of said advertisement bid notifications comprising respective identity information and a respective timestamp; and
   checking for each of said further plurality of advertisement bid win notifications: whether the respective timestamp is older than the predefined time, whether the respective identity information is stored in the cache and whether the respective identity information is stored in the database.

3. A computer implemented method as claimed in claim 2, wherein said checking of said cache to determine whether said respective identity information of a respective one of said further plurality of advertisement bid win notifications is stored in said cache and said checking of said database to determine whether said respective identity information is stored in said database is only performed if said respective timestamp is not older than the predefined time.

4. A computer implemented method as claimed in claim 3, wherein said checking of said database to determine whether said respective identity information is stored in said database is only performed if said respective identity information is not stored in said cache.

5. A computer implemented method as claimed in claim 2, wherein if said respective timestamp of a respective one of said further plurality of advertisement bid win notifications is older than the predefined time, the respective advertisement bid win notification is discarded.

6. A computer implemented method as claimed in claim 2, wherein if said respective identity information of a respective one of said further plurality of advertisement bid win notifications is in at least one of said cache and said database, said respective advertisement bid win notification is discarded.

7. A computer implemented method as claimed in claim 2, comprising removing information associated with a respective one of said further plurality of advertisement bid win notifications from said database when said respective timestamp is older than the predefined time.

8. A computer implemented method as claimed in claim 1, wherein said first advertisement bid win notification comprises data integrity information dependent on said first identity information and said first timestamp.

9. A computer implemented method as claimed in claim 8, wherein said method comprises determining if said data integrity information in said first advertisement bid win notification is consistent with said first identity information and first timestamp in said first advertisement bid win notification.

10. A computer implemented method as claimed in claim 9, wherein said data integrity information comprises a result of a hash function applied to said first identity information and said first timestamp,
wherein said determining if said data integrity information in said advertisement bid win notification is consistent with said first identity information and first timestamp in said first advertisement bid win notification comprises performing the hash function on the first timestamp and first identity information in the first advertisement bid win notification and comparing a result of the performed hash function with the data integrity information.

11. A server comprising:
an input configured to receive a first advertisement bid win notification comprising first identity information and a first timestamp; and
at least one processor configured to:
  determine
    whether said first timestamp is older than a predefined time;
    whether said first identity information is stored in a cache;
    whether said first identity information is stored in a database; and
  when said first timestamp is not older than the predefined time, the first identity information is not in said cache and said first identity information is not in said database, record information associated with said first advertisement bid win notification in said cache and said database.

12. A server as claimed in claim 11, wherein said input is configured to receive a further plurality of advertisement bid win notifications and each of said advertisement bid notifications comprises respective identity information and a respective timestamp,
wherein the at least one processor is configured to check for each of said further plurality of advertisement bid win notifications; whether the respective timestamp is older than a predefined time, whether the respective identity information is stored in the cache, and whether the respective identity information is stored in the database.

13. A server as claimed in claim 12, wherein said at least one processor is configured to check said cache to determine whether said respective identity information of a respective one of said further plurality of advertisement bid win notifications is stored in said cache and to check said database to determine whether said respective identity information is stored in said database only if said first timestamp is not older than the predefined time.

14. A server as claimed in claim 13, wherein said at least one processor is configured to determine whether said respective identity information is stored in said database only if said respective identity information is not in said cache.

15. A server as claimed in claim 12, wherein said at least one processor is configured when said respective timestamp of a respective one of said further plurality of advertisement bid win notifications is older than the predefined time to discard the respective advertisement bid win notification.

16. A server as claimed in claim 12, wherein if said respective identity information of a respective one of said further plurality of advertisement bid win notifications is in at least one of said cache and said database, said respective advertisement bid win notification is discarded.

17. A server as claimed in claim 11, wherein said first advertisement bid win notification comprises data integrity information dependent on said first identity information and said first timestamp.

18. A server as claimed in claim 17, wherein said at least one processor is configured to determine if said data integrity information in said first advertisement bid win notification is consistent with said first identity information and first timestamp in said first advertisement bid win notification.

19. A server as claimed in claim 17, wherein said data integrity information comprises a result of a hash function applied to said first identity information and said first timestamp, and said at least one processor is configured to determine if said data integrity information in said first advertisement bid win notification is consistent with said first identity information and said first timestamp in said advertisement bid win notification by performing the hash function on the first timestamp and first identity information in the first advertisement bid win notification and comparing a result of the performed hash function with the data integrity information.

20. A server as claimed in claim 11, wherein said at least one processor is configured to remove information associated with a respective one of said further plurality of said advertisement bid win notifications from said database when said respective timestamp is older than the predefined time.

21. A server as claimed in claim 11, wherein said server comprises a demand side platform.

22. A computer readable non-transitory storage medium carrying one or more sequences of instructions which when run on at least one processor of a server cause the at least one processor to perform the following steps:
receive a first advertisement bid win notification comprising first identity information and a first timestamp;
  check whether said first timestamp is older than a predefined time;
  check whether said first identity information is stored in a cache;
  check whether said first identity information is stored a database; and
in response to determining that said first timestamp is not older than the predefined time, the first identity information is not in said cache and said first identity information is not in said database, record information associated with said first advertisement bid win notification in said cache and said database.

* * * * *